No. 680,797. Patented Aug. 20, 1901.
R. D. MERSHON.
ELECTROMAGNETIC MOTOR OR RECIPROCATING ENGINE.
(Application filed Nov. 2, 1899.)
(No Model.)
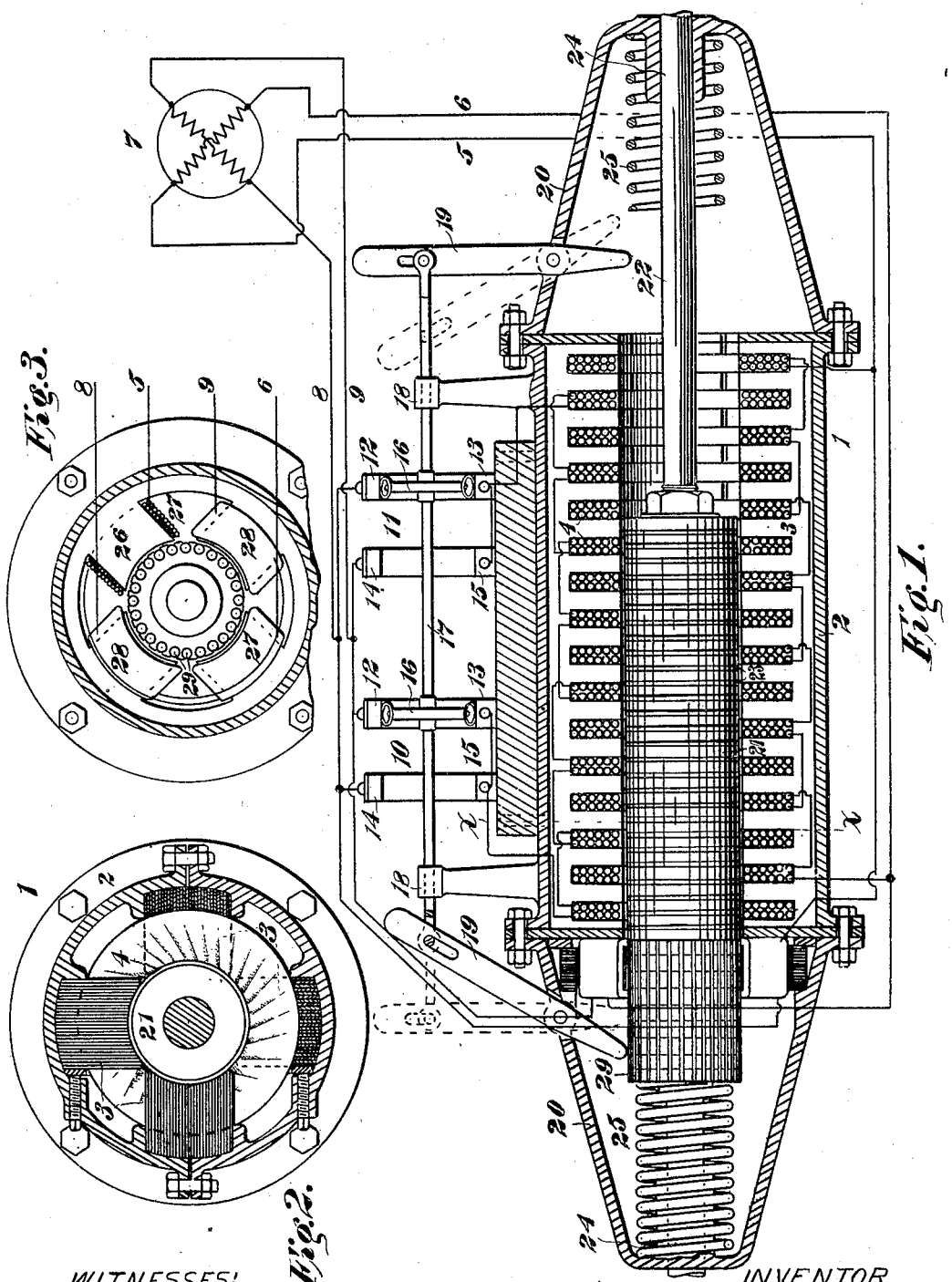
WITNESSES:
INVENTOR
Ralph D. Mershon
BY
ATTORNEY

UNITED STATES PATENT OFFICE.

RALPH D. MERSHON, OF NEW YORK, N. Y., ASSIGNOR TO THE WESTINGHOUSE ELECTRIC & MANUFACTURING COMPANY, OF PENNSYLVANIA.

ELECTROMAGNETIC MOTOR OR RECIPROCATING ENGINE.

SPECIFICATION forming part of Letters Patent No. 680,797, dated August 20, 1901.

Application filed November 2, 1899. Serial No. 735,603. (No model.)

*To all whom it may concern:*

Be it known that I, RALPH D. MERSHON, a citizen of the United States, and a resident of New York, in the county of New York and State of New York, have invented certain new and useful Improvements in Electromagnetic Reciprocating Motors or Engines, of which the following is a specification.

My invention relates to reciprocating electric motors or engines operated by polyphase alternating currents; and it has for its object to provide a motor or engine which shall be comparatively simple in construction and effective in operation and the movable member of which shall so control its actuating magnetic field or fields that the required reciprocating effort shall be exerted thereby.

It has been proposed prior to my present invention to so construct a cylindrical electromagnetic motor or engine that longitudinally-shifting magnetic fields produced therein by means of polyphase currents may be alternately reversed in direction by means of switching devices operated by the generator which supplies the current to the motor, and thus effect a reciprocatory movement of the secondary member or armature. Such an arrangement is unsatisfactory, because the reversals of the magnetic fields are dependent upon the speed of the generator, which in practice is substantially constant, and are therefore effected without regard to the natural vibratory period of the secondary member or armature, in which case the secondary member will not start up from a state of rest unless its natural vibratory period is the same or approximately the same as that of the reversals produced by the generator-switching devices, and in practice this is a condition extremely difficult to secure.

I have illustrated my invention in the accompanying drawings, in which—

Figure 1 is a longitudinal sectional view of a reciprocating motor constructed in accordance with my invention, the electric circuits and switching apparatus being mainly in diagram. Fig. 2 is a transverse section taken on line *x x* of Fig. 1. Fig. 3 is an end elevation of an auxiliary rotary field-motor used in connection with the reciprocating motor.

The primary member of the motor 1 comprises a metallic shell 2 in the form of a cylinder provided interiorly with a laminated-iron core 3, having annular grooves or recesses in which are located the magnetizing or field coils 4. The particular form and arrangement of coils shown is not essential, since a winding arranged and constructed in any other suitable manner known in the art for producing a shifting magnetic field or fields may be employed. This winding may be distributed or otherwise. It may be similar to any of the windings used on the primaries of induction-motors of the rotating type in which one or more magnetic fields or pairs of poles are produced by the currents in the primary windings. As shown, the coils are alternately divided into two sets, those of one set being connected in series to conductors 5 6, which are supplied with currents of one phase from a two-phase generator 7, and those of the other set being connected in series to conductors 8 9, which are supplied by the generator 7 with currents in quadrature with those supplied to conductors 5 6. The magnetic fields thus produced will obviously traverse the motor from end to end.

It will be understood without further illustration or description that the windings may be so arranged and connected as to be supplied with current from a three-phase generator or from one of even a greater number of phases, if desired.

For the purpose of reversing the progressing magnetic field or fields I propose to reverse the circuit connections for one of the phases of current—as, for example, those for the phase supplied by conductors 8 9—by means of two switches 10 and 11, each of which is provided with two pairs of stationary contact-terminals 12 13 and 14 15, with one or the other of which a bridging-piece 16 engages. These bridging-pieces 16 are rigidly mounted upon a rod 17, which is in turn loosely mounted in bearings 18, supported by the cylindrical casing 2. Each end of the rod 17 is connected to the upper end of a lever 19 by means of a slot-and-pin connection, the lever being pivotally mounted upon a suitable support, that shown in the present case being a hollow frusto-conical piece 20, constituting an extension of the cylindrical casing 2. Each of the levers 19 projects a suitable distance below its pivot for a purpose to be hereinafter specified. If the number of out-of-phase currents employed is greater than two, the means employed for effecting reversals of the magnetic field or fields will be correspondingly modified in a manner well known in the art.

The secondary member of the motor is in the form of a cylindrical body 21, of either solid iron or steel or built up of either cast or sheet metal rings or plates supported upon a rod or shaft 22. The core is provided with a considerable number of rings 23, of good conducting material, such as copper, which may be cast into grooves in the core if the latter is a solid casting or may be built up along with the core if the latter is made of cast or sheet iron rings or laminæ. The core is of such dimensions as to very nearly fill the interior space in the primary member, but has sufficient clearance to permit of free movement therein. Bearings 24 for the rod or shaft 22 are provided in the outer ends of the frusto-conical extensions 20, and each of these extensions is provided with a coiled spring 25, which acts as an impact-cushion for the core when the engine is operated under such conditions that the impact is not taken by the material upon which work is being done.

The structure described is well adapted for drills and trip-hammers or any other tools to which it is desired to impart a reciprocating motion.

When the machine is employed for drilling purposes, it is desirable that the drill be given a partial rotation between each two successive strokes in order that its chisel-shaped cutting edge may strike the material operated upon at different angles, and thus drill a substantially cylindrical hole. This partial rotary movement may be effected by mechanical means; but I prefer to produce such movement electromagnetically, as follows: At one end of the primary member 1, and preferably within the frusto-conical extension 20, I place a laminated core 26, provided with windings 27 and 28, properly arranged and connected to the conductors 5 6 and 8 9, so that a rotary magnetic field will be produced therein. The corresponding end of the core 21 is provided with longitudinal conducting bars or rods 29, in order that a rotary movement may be imparted to the plunger when any part of it is within the rotating magnetic field. It will be understood without further illustration or description that the rotary-field construction may be duplicated at the other end of the machine, that it may be located at any intermediate point, or may even extend from end to end of the machine, if desired. It will also be understood that the primary winding may have any form and arrangement known in the art that may be suitable for producing the desired results.

The operation is as follows: Assuming that the machine is started from the position shown in the drawings and the currents supplied produce magnetic fields that are progressing from left to right, these progressing fields will induce currents in the short-circuited rings on the secondary member, which currents reacting on the fields in the same manner as in an ordinary induction-motor will cause the secondary member to move from left to right. The secondary member will continue to move with the magnetic fields until the right-hand end of the core 21 strikes the lower end of the shifting lever 19 at the right and moves it from its full-line position to its broken-line position. This movement of the lever to the broken-line position will effect a longitudinal movement of the switch-rod 17 and the bridging-pieces 16, so as to bring the latter respectively into engagement with the pairs of contact-levers 14 15, and thus reverse the current of the phase corresponding to conductors 8 and 9. This reversal instantly produces a reversal in the direction of the progression of the magnetic fields, which acting in their new movement upon the secondary member give it a reverse motion from rest if it has been brought to rest by the work being done, or if it be in motion by bringing it to rest and setting it in motion in the opposite direction. This movement will continue until the left-hand end of the secondary member strikes the lower end of the switch-actuating lever 19 at the left and moves it from its broken-line to its full-line position. Before the movement of the lever 19 is effected, however, the secondary member will come into the rotating magnetic field of the auxiliary motor and the drill will be given a movement of rotation which will last until the secondary member is again moved beyond the influence of the rotary field. The movement of lever 19 effects a reversal of the circuit connections in the manner and by the means already described, and the secondary member will therefore start on its return stroke. It will thus be seen that the reversal of the circuit connections for one of the phases of current, and consequently the reversal of the shifting magnetic fields, is entirely dependent upon the movement of the secondary member of the motor.

I desire it to be understood that my invention is not limited to the specific details of construction shown and described, since these may be modified by one skilled in the art without departing from the spirit and scope of the invention.

I claim as my invention—

1. An electric engine for operating drills or similar devices, comprising means for producing a longitudinally-progressive magnetic field, a plunger actuated by said field and serving to reverse it, and electromagnetic means for effecting a partial rotation of said plunger, substantially as described.

2. In an electric engine for operating drills or similar devices, the combination with means for producing a longitudinally-progressive magnetic field, of a plunger actuated by said field, means actuated by the plunger for reversing the field, and means for producing a rotary magnetic field in the path of movement of the plunger, substantially as described.

Signed at New York, in the county of New York and State of New York, this 19th day of October, A. D. 1899.

RALPH D. MERSHON.

Witnesses:
   CHARLES B. HILL,
   WM. H. CAPEL.